2,813,563

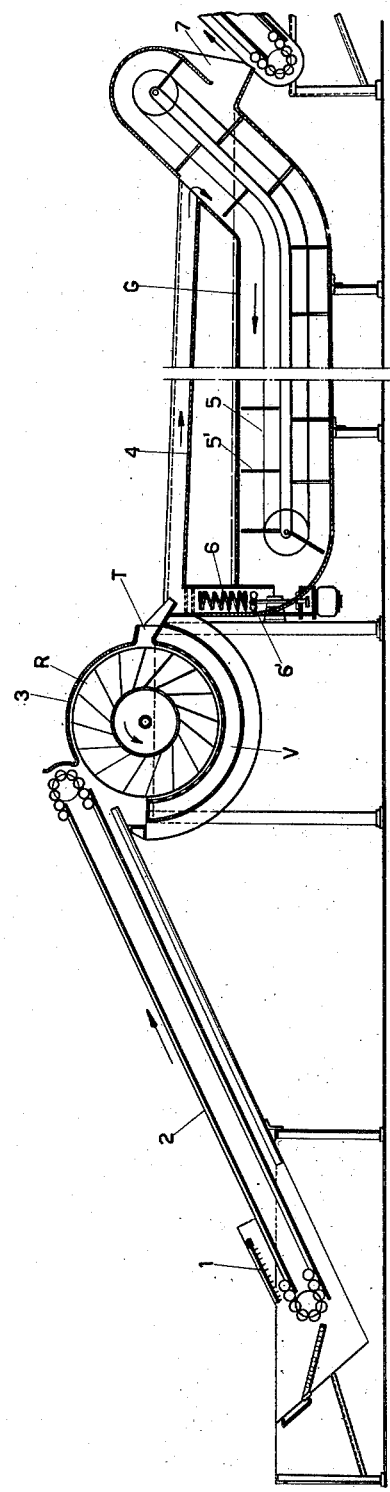

PROCESS FOR FACILITATING THE PEELING OF TOMATOES AND APPARATUS FOR PERFORMING SAID PROCESS

Delfino Cagnoni, Milan, Italy

Application December 14, 1955, Serial No. 553,123

Claims priority, application Italy December 18, 1954

4 Claims. (Cl. 146—228)

The problem of peeling tomatoes for preparing the so-called "peeled tomatoes" has always been subjected to considerable hindrances due to the remarkable adhesion of the skin to the flesh of the fruit and to the softness of the flesh itself.

The hitherto adopted procedure consisted in "scalding," in water at from 80° to 100° C., the washed fruit, after which the peeling operation proper, manually or mechanically performed, took place.

The satisfactory solution of this problem is not attainable without carefully considering a suitable pre-treatment of the fruit, aiming to facilitate its peeling.

The "scalding" of the fruit to be peeled suffers from a number of drawbacks: an excessive heating has not, surely, a favourable influence on the intrinsic properties of the finished product and, in addition, causes softening of the fruit flesh. This latter phenomenon, even though for the preparation of peeled tomatoes sorted qualities having a firm flesh are selected (the "San Marzano" variety is preferred in Italy), is not such as to facilitate peeling, as the skin offers, yet in normal conditions, a mechanical strength higher than that offered by the flesh of the fruit.

The chemical means, sometimes adopted to facilitate peeling, for instance alkaline baths and others, always impair, more or less, the intrinsic properties of the fruit, even taking into consideration only those chemicals the use of which is tolerated by public health law and regulations.

It is an object of the present invention to point out a process intended to facilitate the removal of the skin only from the flesh of tomatoes to be used for the production of "peeled tomatoes" and to describe a plant for putting this process into practice.

All the processes of the prior and contemporary art have the defect, without exception, that a noticeable amount of the flesh is removed on removal of the skin. The process of the invention is, according to the above considerations, a merely physical process: it is based on the application of sub-zero temperatures in its first stage.

It has been, in fact, surprisingly ascertained that, on immersing the fruit in a chilled fluid, either liquid or gaseous, at a temperature around −10° C. (minus ten), for a period ranging from 20 to 30 seconds approximately, and causing thus a superficial freezing i. e. limited to the skin only, then successively defrosting and leaving the fruit at a temperature somewhat higher than that of defrosting for a certain time, the skin is completely separated from the flesh so that it is then convenient to proceed with the peeling operation proper, by hand or mechanically, of the tomatoes.

How the process is performed in practice, will be described hereafter and illustrated in the accompanying drawing which diagrammatically shows a plant capable of performing the process of this invention.

The diagram shown in the drawing is given by way of example only and does not imply any limitation whatsoever. Reference being now had to the diagram, the fruits, after having been washed under a shower coming from pinholed manifolds 1, are forwarded to the conveying device, which is embodied in an upwardly inclined conveyor 2: therefrom they come to the freezing unit 3.

Said unit essentially comprises a wheel R, having oblique spokes, the inclination of which is directed contrarily to the sense of rotation of the wheel (in the drawing an anticlockwise sense is assumed) and a vat V in which wheel R rotates, immersed for about one half of its periphery.

Vat V contains brine kept at a temperature in the very neighbourhood of −10° C. (minus ten) by a refrigerating coil (not shown).

By the chute T, vat V is in communication with the defrosting unit 4 which contains water and a device 6, of any optional description, for heating water at a pre-selected temperature: said water is circulated by an impeller screw 6' or other means.

In the defrosting unit 4 there is a conveyor 5 fitted with rigid members 5' (e. g. sheets) distributed at uniform distance each from the adjacent ones. This conveyor forwards the fruits, that the grate G maintains immersed in the defrosting liquid during their stay in the defrosting unit, towards the discharge chute 7. On bearing the foregoing in mind, it is not difficult to imagine the process: the fruits to be peeled are loaded in the conveyor 2 and are passed to the freezing unit 3: the shape of wheel R has been devised so that to keep the fruits immersed in the freezing liquid while passing therethrough.

The speed of rotation of the wheel should be so selected as to have a time of contact of the fruits with the freezing liquid of the order of 20–30 seconds, which has proved to be an optimum time: the optimum temperature, as above pointed out, lies in the very neighbourhood of −10° C. (minus ten).

However things may be, the depth of freezing of the fruit is to be lesser than 3 mm. (0.118 in.) and preferably limited to a very little extent beyond the skin, so as to affect but the gluey substance which causes the adhesion of the skin to the flesh.

The fruits must now be defrosted: for this step a certain temperature is not strictly prescribed for, apparently, the higher (within the range, somewhat ample however, allowed by the nature of the fruit) the temperature of defrosting, the quicker said defrosting intervenes.

It has been, however, ascertained, in practice, that the most suitable temperature for achieving a relatively quick defrosting while keeping the intrinsic properties, which make the fruit tasty and palatable, unaltered, ranges from 20° C. to 40° C. approx. for the water of the defrosting bath.

In this bath, the defrosting occurs very rapidly, that is to say, in practice, some ten seconds or a not too great multiple thereof.

Once defrosting is completed, the skin is still adherent and sticked to the flesh, but, should the tomato be left in the defrosting bath for 10 minutes approx. with a temperature of the bath of 40° C., the thorough unsticking and separation of the skin from the flesh is achieved, thus a convenient peeling operation becoming practicable thereafter.

The colour the tomato skin assumes is a very important indicator: as a matter of fact, as soon as the fruit undergoes the rapid superficial freezing, the characteristic red colour of the skin turns towards an orange hue, whereas, as on the subsequent defrosting, said characteristic red colour is wholly restored.

The outstanding advantage of the process just now described stands that the peeling operation proper can be easily performed, by hand or mechanically, without "scalding" the tomato, for, with this process, a temperature of some degrees above zero is enough to cause, on completion of the actual defrosting, the unsticking and the separation of the skin; by employing, however, for the defrosting proper and for the successive treatment as well, temperatures lying between 20° C. and 40° C. are the most suitable ones for the industrial practice, as aforesaid.

Further advantages are that the peeled fruit has a firmer flesh which does not squash after the pasteurization of the canned product.

What I claim is:

1. A process for treating tomatoes so as to facilitate the peeling thereof, comprising the steps of freezing the tomatoes for a period of time sufficient to produce superficial freezing thereof to a depth only slightly exceeding the thickness of the skins thereof completely defrosting the frozen tomatoes, and continuing to warm the defrosted tomatoes until the skins separate from the flesh thereof.

2. A process for treating tomatoes so as to facilitate the peeling thereof, comprising the steps of subjecting the tomatoes to a temperature of approximately −10° centigrade for a period of from about 20 to about 30 seconds to effect freezing of only the outer portion of the tomatoes, and completely defrosting the frozen tomatoes by warming the latter at a temperature higher than the ambient temperatures until the skins of the tomatoes separate from the flesh thereof.

3. A process for treating tomatoes so as to facilitate the peeling thereof, comprising the steps of subjecting the tomatoes to a temperature of approximately −10° centigrade for a period of time sufficient to superficially freeze the tomatoes to a depth of about 1 mm. below the outer surface thereof, and immersing the frozen tomatoes in water at a temperature of from about 20° to about 40° centigrade for a period of approximately 10 minutes to effect complete defrosting of the tomatoes and the separation of the skins from the flesh thereof.

4. A process for treating tomatoes so as to facilitate the peeling thereof, comprising the steps of subjecting the tomatoes to a temperature of approximately −10° centigrade for a period of about 20 to about 30 seconds to effect the superficial quick freezing of the outer portions thereof, and then heating the frozen tomatoes at a temperature of about 20° to about 40° centigrade for a period of approximately 10 minutes to effect complete defrosting of the tomatoes and the separation of the skins from the flesh thereof.

References Cited in the file of this patent

UNITED STATES PATENTS

| | | |
|---|---|---|
| 812,971 | Adams | Feb. 20, 1906 |
| 2,097,479 | Taylor | Nov. 2, 1937 |
| 2,429,785 | Winters | Oct. 28, 1947 |
| 2,697,463 | Desrosier | Dec. 21, 1954 |